US010078887B2

(12) United States Patent
Mercier et al.

(10) Patent No.: US 10,078,887 B2
(45) Date of Patent: Sep. 18, 2018

(54) SCENE-BASED NON-UNIFORMITY CORRECTION IN FOCAL PLANE ARRAYS

(71) Applicant: BAE Systems Information and Electronic Systems Integration Inc., Nashua, NH (US)

(72) Inventors: Michael N. Mercier, Nashua, NH (US); Kevin C. Cole, Nashua, NH (US); Joseph M. Schlupf, Newburyport, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/108,602

(22) PCT Filed: Oct. 20, 2015

(86) PCT No.: PCT/US2015/056464
§ 371 (c)(1),
(2) Date: Jun. 28, 2016

(87) PCT Pub. No.: WO2016/064879
PCT Pub. Date: Apr. 28, 2016

(65) Prior Publication Data
US 2016/0321789 A1    Nov. 3, 2016

Related U.S. Application Data

(60) Provisional application No. 62/065,970, filed on Oct. 20, 2014.

(51) Int. Cl.
*G06K 9/40* (2006.01)
*G06T 5/20* (2006.01)
(Continued)

(52) U.S. Cl.
CPC ............... *G06T 5/20* (2013.01); *G06T 5/50* (2013.01); *H04N 5/232* (2013.01);
(Continued)

(58) Field of Classification Search
None
See application file for complete search history.

(56) References Cited

U.S. PATENT DOCUMENTS 5,512,956 A    4/1996 Yan
6,360,025 B1    3/2002 Florent
(Continued)

OTHER PUBLICATIONS

Hu et al., "Non-uniformity correction of infrared focal plane array in point target surveillance systems", Infrared Physics & Technology 66 (2014) 56-69.*
(Continued)

*Primary Examiner* — Randolph I Chu
(74) *Attorney, Agent, or Firm* — McCarter & English, LLP

(57) ABSTRACT

Methods and systems for correcting non-uniformity in focal plane arrays include averaging pixel intensity values from a plurality of data captures to generate an image, spatially median filtering the image to generate a median filtered image, temporally stacking the median filtered image with at least one previously median filtered images to generate a median filtered image stack, and temporally median filtering a pixel offset value stack corresponding to each of a plurality of filtered pixel locations within the median filtered image stack to generate a process dataset.

14 Claims, 11 Drawing Sheets

(51) Int. Cl.
*G06T 5/50* (2006.01)
*H04N 5/232* (2006.01)

(52) U.S. Cl.
CPC ............... *G06T 2207/10004* (2013.01); *G06T 2207/20032* (2013.01); *G06T 2207/20216* (2013.01)

(56) References Cited

U.S. PATENT DOCUMENTS

| | | | |
|---|---|---|---|
| 7,145,607 | B1 | 12/2006 | Hui |
| 9,635,285 | B2* | 4/2017 | Teich ................... G06K 9/0051 |
| 2004/0196901 | A1 | 10/2004 | Demos |
| 2015/0146009 | A1* | 5/2015 | Kostrzewa ........... H04N 5/2256 |
| | | | 348/164 |
| 2016/0044306 | A1* | 2/2016 | Chahine ............... H04N 5/2353 |
| | | | 348/164 |
| 2016/0056785 | A1* | 2/2016 | Wolfe ....................... G01J 1/18 |
| | | | 250/340 |
| 2016/0057369 | A1* | 2/2016 | Wolfe ..................... H04N 5/33 |
| | | | 348/322 |
| 2016/0065848 | A1* | 3/2016 | LeBeau ..................... G01J 5/30 |
| | | | 348/135 |
| 2016/0080664 | A1* | 3/2016 | Henry ............... H04N 5/23293 |
| | | | 348/164 |
| 2016/0156858 | A1* | 6/2016 | Lee ........................... G06T 5/20 |
| | | | 348/241 |

OTHER PUBLICATIONS

Ratliff et al. "An algebraic algorithm for nonuniformity correction in focal-plane arrays", 2002 Optical Society of America, vol. 19, No. 9/Sep. 2002, pp. 1737-1747.*
PCT/US2015/056464 International Search Report dated Jan. 6, 2016.

* cited by examiner

|   |    |   |   |
|---|----|---|---|
| 1 | 2  | 3 | 4 |
| 5 | 6  | 7 | 8 |
| 9 | 25 | 9 | 8 |
| 7 | 6  | 5 | 4 |

FIG. 2A

|   |   |   |   |
|---|---|---|---|
|   |   |   |   |
|   | 6 | 7 |   |
|   | 7 | 7 |   |
|   |   |   |   |

FIG. 2B

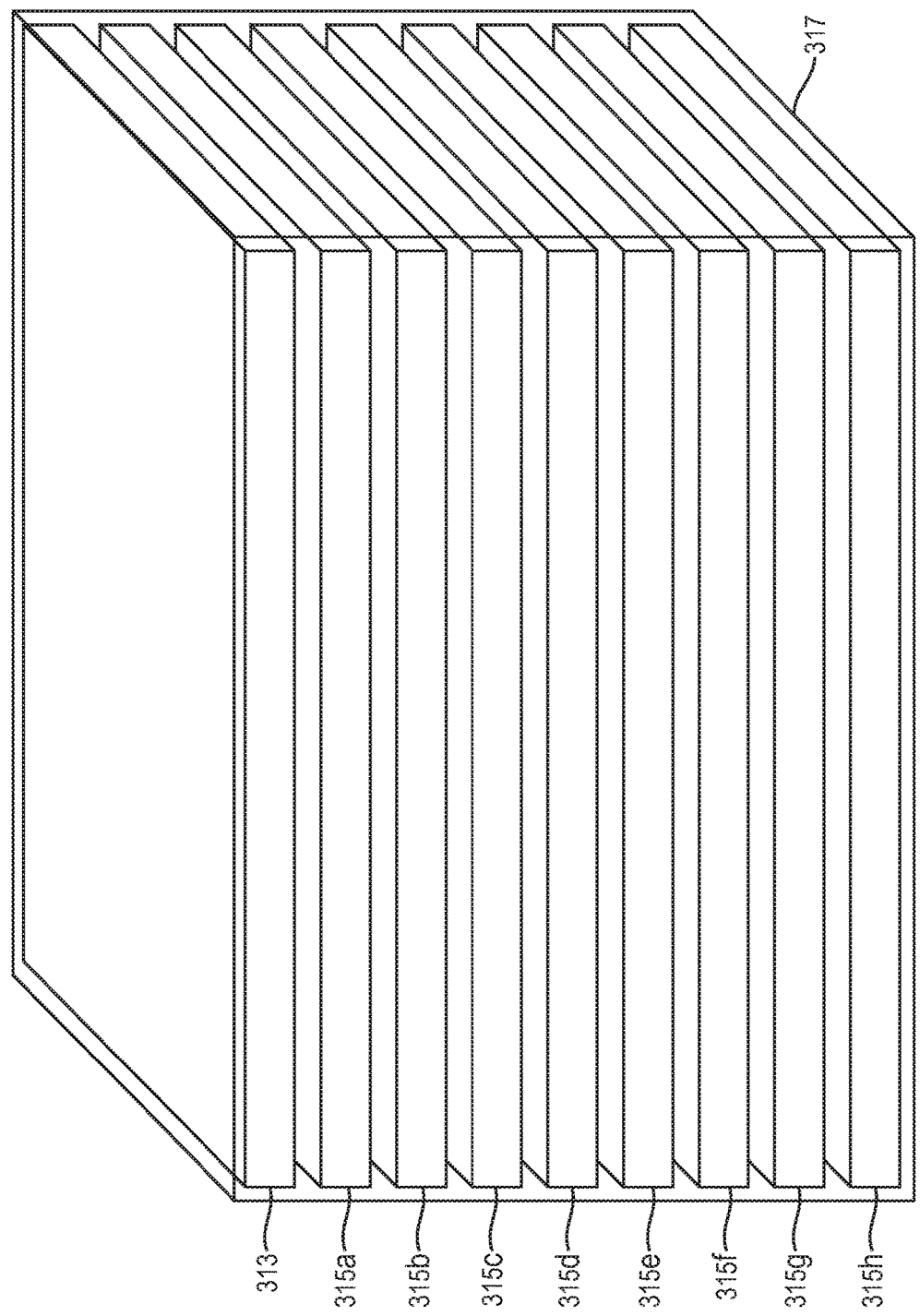

SCENE-BASED NON-UNIFORMITY CORRECTION IN FOCAL PLANE ARRAYS

RELATED APPLICATION

This application claims benefit of and priority to U.S. provisional application Ser. No. 62/065,970, filed Oct. 20, 2014, which is incorporated herein by reference in its entirety.

TECHNICAL FIELD

The present disclosure generally relates to image sensors, and more particularly to correcting non-uniformity in focal plane arrays.

BACKGROUND

Focal plane arrays including one or more image sensors are useful for creating images from a broad range of devices, including infrared cameras, video cameras, and any other form of image sensing device. However, focal plane arrays suffer from offset drift, a temporally changing dc-bias in the pixel read-out circuitry, which introduces artifacts and corrupts the quality of images produced by the array. That is, if the focal plane array has no incident energy on the detector, a baseline intensity of radiation will still be measured by each pixel detector of each image sensor. This is referred to as offset drift and must be properly accounted for in order to create accurate images. It is particularly of interest in infrared focal plane arrays, where offsets drift is often significant between each cooldown cycle on the focal plane array.

SUMMARY

In one embodiment, a method for correcting non-uniformity in focal plane arrays is provided. The method includes receiving, at a computing device, a plurality of data captures from an image sensor, each of the plurality of data captures including a plurality of pixel intensity values, each of the plurality of pixel intensity values of each data capture corresponding to one of a plurality of pixel locations. The method also includes averaging, by a processing component of the computing device, for each respective one of the pixel locations, at least two of the pixel intensity values to generate an image, each of the at least two of the pixel intensity values corresponds to a different one of the data captures and corresponding to a common one of the pixel locations. The method also includes spatially median filtering, by the processing component of the computing device, the image to generate a median filtered image. The median filtered image includes a plurality of spatially filtered pixel intensity values, each of the plurality of spatially filtered pixel intensity values corresponds to one of a plurality of filtered pixel locations and is representative of a pixel offset value corresponding to the corresponding one of the filtered pixel locations. The method also includes temporally stacking the median filtered image with at least one previously median filtered image stored in a memory component of the computing device to generate a median filtered image stack including a plurality of pixel offset value stacks, each of the pixel offset value stacks corresponding to one of the filtered pixel locations and including at least two stacked pixel offset values, each of the at least two stacked pixel offset values corresponds to a different one of the median filtered image or the at least one previously median filtered image and corresponds to a common one of the filtered pixel locations. The method also includes temporally median filtering, by the processing component of the computing device, each of the plurality of pixel offset value stacks of the median filtered image stack to generate a process dataset.

In another embodiment, a system for correcting non-uniformity in focal plane arrays is provided. The system includes an image sensor configured to capture image data. The system also includes a computing device in electronic communication with the image sensor and having a memory component and a processing component. The memory component includes instructions that, when executed by the processing component, cause the computing device to receive a plurality of data captures from the image sensor, each of the plurality of data captures including a plurality of pixel intensity values, each of the plurality of pixel intensity values of each data capture corresponding to one of a plurality of pixel locations. The memory component also includes instructions that, when executed by the processing component, cause the computing device to average, for each respective one of the pixel locations, at least two of the pixel intensity values to generate an image, each of the at least two of the pixel intensity values corresponding to a different one of the data captures and corresponding to a common one of the pixel locations. The memory component also includes instructions that, when executed by the processing component, cause the computing device to spatially median filter the image to generate a median filtered image, the median filtered image including a plurality of spatially filtered pixel intensity values, each of the plurality of spatially filtered pixel intensity values corresponding to one of a plurality of filtered pixel locations and representative of a pixel offset value corresponding to the corresponding one of the filtered pixel locations. The memory component also includes instructions that, when executed by the processing component, cause the computing device to temporally stack the median filtered image with at least one previously median filtered image stored in the memory component of the computing device to generate a median filtered image stack including a plurality of pixel offset value stacks, each of the pixel offset value stacks corresponding to one of the filtered pixel locations and including at least two stacked pixel offset values, each of the at least two stacked pixel offset values corresponding to a different one of the median filtered image or the at least one previously median filtered image and corresponding to a common one of the filtered pixel locations. The memory component also includes instructions that, when executed by the processing component, cause the computing device to temporally median filter each of the plurality of pixel offset value stacks of the median filtered image stack to generate a process dataset.

In another embodiment, a non-transitory computer-readable medium is provided. The non-transitory computer-readable medium includes instructions stored thereon that, when executed by a processing component, cause a computing device of a system for correcting non-uniformity in focal plane arrays to receive, at the computing device, a plurality of data captures from an image sensor, each of the plurality of data captures including a plurality of pixel intensity values, each of the plurality of pixel intensity values of each data capture corresponding to one of a plurality of pixel locations. The non-transitory computer-readable medium includes instructions stored thereon that, when executed by a processing component, cause a computing device of a system for correcting non-uniformity in focal plane arrays to average, by the processing component of the computing device, for each respective one of the pixel locations, at least two of the pixel intensity values to generate an image, each of the at least two of the pixel intensity values corresponding to a different one of the data captures and corresponding to a common one of the pixel locations. The non-transitory computer-readable medium includes instructions stored thereon that, when executed by a processing component, cause a computing device of a system for correcting non-uniformity in focal plane arrays to spatially median filter, by the processing component of the computing device, the image to generate a median filtered image, the median filtered image including a plurality of spatially filtered pixel intensity values, each of the plurality of spatially filtered pixel intensity values corresponding to one of a plurality of filtered pixel locations and representative of a pixel offset value corresponding to the corresponding one of the filtered pixel locations. The non-transitory computer-readable medium includes instructions stored thereon that, when executed by a processing component, cause a computing device of a system for correcting non-uniformity in focal plane arrays to temporally stack the median filtered image with at least one previously median filtered image stored in a memory component of the computing device to generate a median filtered image stack including a plurality of pixel offset value stacks, each of the pixel offset value stacks corresponding to one of the filtered pixel locations and including at least two stacked pixel offset values, each of the at least two stacked pixel offset values corresponding to a different one of the median filtered image or the at least one previously median filtered image and corresponding to a common one of the filtered pixel locations. The non-transitory computer-readable medium includes instructions stored thereon that, when executed by a processing component, cause a computing device of a system for correcting non-uniformity in focal plane arrays to temporally median filter, by the processing component of the computing device, each of the plurality of pixel offset value stacks of the median filtered image stack to generate a process dataset.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2A is a pixel map illustrating an unfiltered image in accordance with various embodiments taught herein.

FIG. 2B is a filtered pixel map illustrating a filtered output resulting from spatial median filtering of the unfiltered image of FIG. 2A in accordance with various embodiments taught herein.

FIGS. 3A-3C are isometric diagrams illustrating construction of a median filtered image stack in accordance with various embodiments taught herein.

DETAILED DESCRIPTION

Figure 1:
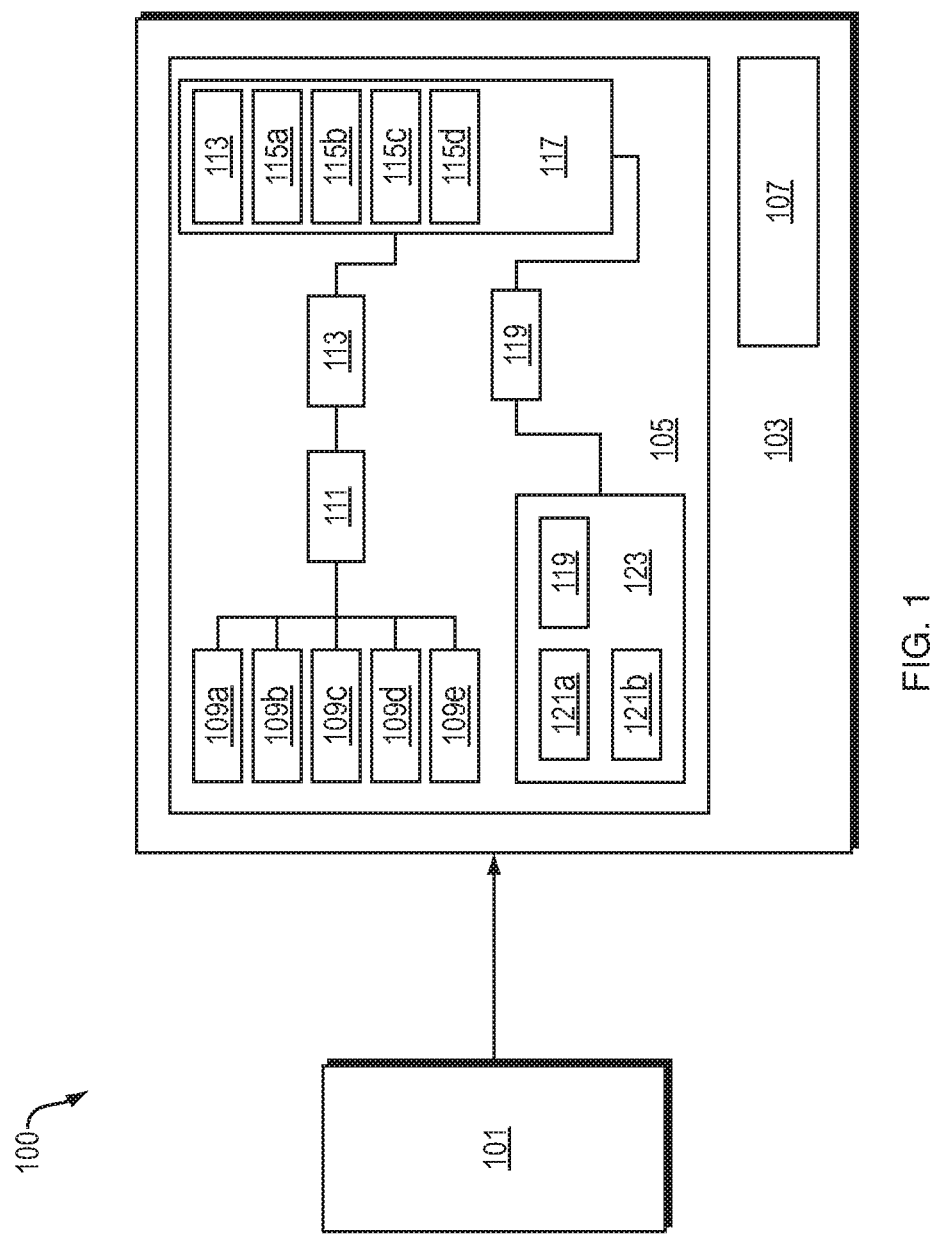
FIG. 1 is a block diagram showing a system for correcting non-uniformity in focal plane arrays in accordance with various embodiments taught herein.

As discussed above, focal plane arrays suffer from offset drift, which introduces artifacts and corrupts the quality of images produced by the array. The offset values are non-uniform and drift over time, resulting in a drifting offset pattern and rendering it impossible to account for offset with a single, constant, focal plane-wide or pixel-specific offset value. Conventionally, correcting offset requires regular calibration sessions (i.e., at least every time the imaging system is cycled off and then back on) where the focal plane array is blocked by a uniform shutter for some portion of time while measurements are made, measurement data is processed, and lookup tables are updated with appropriate offsets. However, in many imaging system applications it is impractical to include a physical shutter required for calibration. In other imaging systems, the frequency and down time associated with these methods renders them impracticable for many applications.

Some conventional methods use scene-based correction methods wherein the focal plane array is active during offset correction. However, these methods rely on complex algorithms which must be solved in relation to each element in a very large dataset (e.g., pixel by pixel over each frame captured by a high resolution imaging system). Such methods thus present a vast, time-consuming draw on processing resources and are simply too cumbersome to deliver rapid results, especially for a size or weight-limited host platform such as is found on an aircraft or other type of vehicle. Furthermore, known scene-based correction methods suffer from a phenomenon called "burn-in" which occurs when a large, high-intensity object such as the sun is in the field of view of the focal plane array for an extended period of time. Burn-in occurs because the intensity, size, and dwell time (i.e., amount of time spent within the field of view (FOV) of the image sensor, especially at one particular pixel location within the FOV) of the high-intensity object causes the above-referenced complex algorithms to treat the high-intensity object as an offset. Thus the correction algorithm(s) "burn in" an artificially high offset value, which results in an artificially large negative value when the "burned-in" image moves in the focal plane and therefore can cause the imaging system to produce corrupted or distorted images, filter out desirable content, or include undesirable content.

The burn in phenomenon is significant, for example, because incorrect offsets can cause artificial contrast in the resulting image. Artificial contrast can include individual pixels or rows or columns of pixels that return either higher or lower values than adjacent pixels. Because most image processing algorithms rely on contrast to determine features in an image, this artificial contrast adds unnecessary noise and clutter to the image, reducing the algorithm's ability to detect features of interest.

Embodiments are provided herein for correcting non-uniformity in focal plane arrays. The embodiments, in accordance with various embodiments, are configured to receive data captures from an image sensor. Each of the data captures includes pixel intensity values, each of the pixel intensity values corresponding to a pixel location. The embodiments are also configured to average, by a processing component of the computing device, for each of the pixel locations, at least two of the pixel intensity values to generate an image. Each of the at least two averaged pixel intensity values corresponds to a different one of the data captures and corresponds to a common one of the pixel locations. The embodiments are also configured to spatially median filter the image to generate a median filtered image (MFI). The MFI includes spatially filtered pixel intensity values, each of which corresponds to a filtered pixel location and represents a pixel offset value corresponding to the corresponding filtered pixel location. Advantageously, the spatial median filter, as described with greater detail below, prevents large or wide objects in the image from being interpreted as artifacts in need of correction.

The embodiments are also configured to temporally stack the MFI with at least one previously median filtered image to generate a MFI stack. The MFI stack includes pixel offset value stacks, where each of the pixel offset value stacks corresponds to one of the filtered pixel locations. The pixel offset value stacks each include at least two stacked pixel offset values. Each of the at least two stacked pixel offset values corresponds to a different one of the median filtered image or the at least one previously median filtered image and corresponds to a common one of the filtered pixel locations. The embodiments are also configured to temporally median filter each of the pixel offset value stacks of the MFI stack to generate a process dataset (PDS). Advantageously, the temporal median filter, as described with greater detail below, reduces the corrupting effect of transient objects because a transient object seen in one particular pixel at one particular point in time will move and therefore be discarded as an outlier in the temporal pixel data.

Further advantageously, the spatial median filter and the temporal median filter can be performed rapidly and at very low consumption of processing resources as compared to complex offset algorithms. Thus, in accordance with various embodiments, the methods, mediums and systems provided herein are able to rapidly and continuously correct offset non-uniformity in focal plane arrays and avoid burn-in while consuming minimal processing resources.

In accordance with various embodiments, the embodiments can also include a standard deviation limiter, wherein any of the stacked spatially filtered pixel offset values exceeding a preset temporal standard deviation threshold as compared to the other stacked spatially filtered pixel offset values is discarded. The standard deviation limiter is effective in this regard because true offset values and values associated with abnormally bright objects (e.g., the sun), advantageously prevents such abnormally bright objects from causing burn-in while avoiding any uncorrected offsets.

In accordance with various embodiments, the PDS can be stored in an offset file resident in a memory component of the computing device and averaged (e.g., according to an arithmetic mean, a weighted arithmetic mean, or an alpha-beta filter) with at least one previously generated process dataset stored in the offset file. Thus, as more PDSs are added to the offset file over time, the offset file can advantageously provide a progressively more accurate correction of non-uniformity in the focal plane array.

Referring now to FIG. 1, a system 100 for correcting non-uniformity in focal plane arrays includes an image sensor 101 configured to capture image data in a plurality of discrete data captures (frames) over time. The system 100 also includes a computing device 103 having a processing component 107 and a memory component 105. The computing device 103 is configured to receive data captures (frames) 109a-e from the image sensor 101, each frame including pixel intensity values, each of the pixel intensity values corresponding to an N×M pixel location within the FOV of the image sensor 101. A pixel intensity value is a numerical expression of brightness of detected radiation by one or more pixel detectors associated with each pixel location. The pixel intensity value can, using an 8-bit grayscale system for example, be a number ranging between 0 and 255, where zero indicates minimum intensity black and 255 indicates maximum intensity white. The system 100 is also configured, by the processing component 107, to average the pixel intensity values for each respective one of the pixel locations to generate an image 111. The average at each pixel location is of at least two of the pixel intensity values, where each of the at least two of the pixel intensity values corresponds to a different one of the data captures 109a-e and corresponds to a common one of the pixel locations.

Figures 2A, 2B:
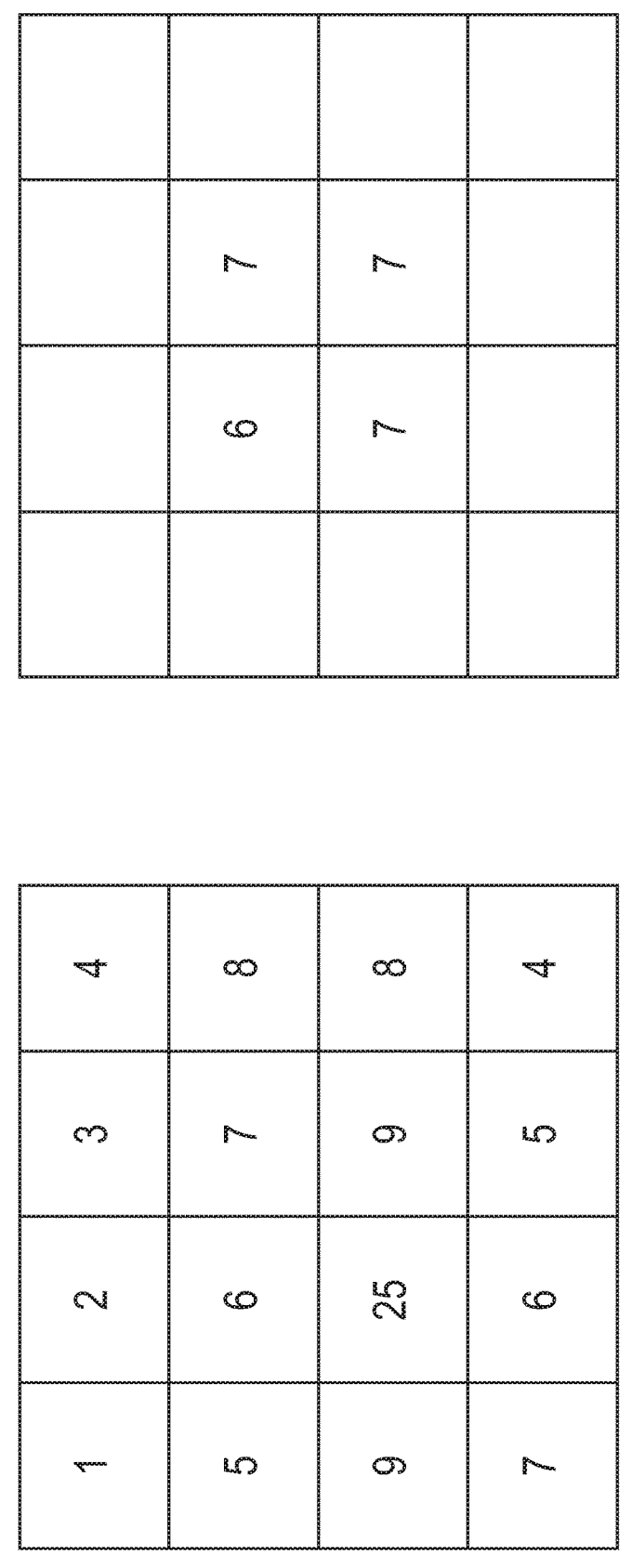

The system 100, by the processing component 107, is also configured to apply a median spatial filter to the image 111 to create a median filtered image (MFI) 113, which is stored in the memory component 105. A median spatial filter, as described with greater detail below with reference to FIGS. 2A and 2B, is a filter that overlays a group of the pixel locations of the raw N×M image 111 with a J×K "kernel." The median spatial filter then determines a median value of the pixel intensity values corresponding to the pixel locations overlaid by the J×K kernel. The median spatial filter then assigns the median pixel intensity value median pixel intensity value to one of the overlaid pixel locations. A median filtered image (MFI) 113 is produced by applying the median spatial filter to as many of the pixel locations within the image 111 as possible (see FIGS. 2A and 2B for additional detail). Each filtered pixel intensity value thus corresponds to a filtered pixel location of the MFI 113. The spatially filtered pixel intensity values of the MFI 113 are therefore representative of pixel offset values for the image 111.

The computing device 103 is further configured to add the MFI 113 to a MFI stack 117 stored in the memory component 105. The MFI stack 117 is a group of temporally stacked median filtered images, including the MFI 113 and previously median filtered images 115a-d as described with greater detail below with reference to FIGS. 3A-3C. The MFI stack 117 thus includes a pixel offset value stack corresponding to each of the filtered pixel locations (e.g. pixel offset value stack 318 as shown in FIG. 3C).

The computing device 103 is also configured, by the processing component 107, to apply a temporal median filter to the MFI Stack 117 such that the temporal median filter is applied to the plurality of stacked pixel offset values corresponding to each of the plurality of stacked pixels of the MFI Stack 117 to generate a process dataset 119 representative of averaged, spatially median filtered, and temporally median filtered offset values associated with each of the plurality of filtered pixel locations. The computing device 103 is further configured to add the process dataset 119 to an offset file 123 stored in the memory component 105. The offset file 123 includes a plurality of previously generated process datasets 121a-b which can be averaged (e.g., by an alpha-beta filter weighted average) with the process dataset 119 to continuously update and improve a plurality of averaged offset values associated with the offset file 123.

Image sensor 101, in accordance with various embodiments, can be any suitable device such as, for example but not limited to, digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof. It will be apparent in view of this disclosure that image sensor 101, in accordance with various embodiments can encompass any sensor configured to capture electromagnetic radiation in any spectrum for producing an image, including, for example, infrared radiation, visible light, ultraviolet radiation, x-rays, etc. In use, in accordance with various embodiments, the image sensor 101 records a plurality of data captures (frames) over time. The data associated with each frame can include spectral data (i.e., frequency of the received radiation) and intensity data (i.e., amplitude of the received radiation) for each pixel of the image sensor 101. The frame and associated data is then transmitted to or retrieved by the computing device 103.

Computing system 103, in accordance with various embodiments, can include one or more server systems, desktop computer devices, mobile computer devices, field-programmable gate arrays (FPGA), microprocessors, application specific integrated circuits, integrated circuits, monolithic integrated circuits, microchips, programmable logic devices, complex programmable logic devices, any other suitable devices capable of including both processing components 107 and memory components 105, or combinations thereof. The processing component 107 of the computing system 103 can include one or more logic blocks, logic gates, field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. The memory component 105 can include a computational device memory or random access memory, such as DRAM, SRAM, EDO RAM, and the like as well as, for example, flip-flops, memory blocks, RAM blocks, programmable read-only memory, any other suitable type of digital or analog memory, or combinations thereof.

In use, in accordance with various embodiments, the system 100 rapidly corrects non-uniformity in focal plane arrays by averaging pixel offset values associated with each of the pixels of the plurality of frames 109a-e received from the image sensor 101 to generate an image 111, spatially median filtering the image 111 to produce a median filtered image 113, temporally stacking the median filtered image 113 with previously median filtered images 115a-d in a MFI stack 117, and temporally filtering the MFI stack 117 to create a process dataset 119. The process dataset 119 is then averaged with previously generated process datasets 121a-b and stored in an offset file 123.

The median spatial filter, in accordance with various embodiments, allows the system 100 to avoid interpreting large or wide objects in the image as offset artifacts in need of correction. As shown in FIGS. 2A-2B, a median filter having a 3×3 kernel is, for simplicity, applied to a 4×4 (i.e., 16 pixel) frame. It will however, be apparent in view of this disclosure that any frame of size N×M can be used with any kernel of size J×K. As illustrated by FIG. 2A, the unfiltered image 111 includes a variety of average pixel intensity values ranging from 1 to 25. As illustrated by FIG. 2B, applying the spatial median filter to the pixels within the frame causes the intensity values of each pixel to be reduced to a median value within the kernel and assigned to the center pixel within the kernel. Therefore, because the assigned value is a median intensity value, rather than the actual detected value or a mean filtered value, aberrant, intense, concentrated radiant energy (e.g., pixel intensity value 25 as shown) is discarded, preventing non-offset sources within the field of view (FOV) of the image sensor 101 from mistakenly being interpreted as offsets. Thus, large bright objects are not included in the offset values assigned to the filtered pixels of the median filtered image 113.

As further shown in FIG. 2B, because the center of the 3×3 kernel cannot be placed over pixels border columns and rows of an N×M image without introducing null values, the median filtered image of FIG. 2B is smaller (e.g., N-2×M-2 or 2×2 as shown) than the image of FIG. 2A. It will be apparent in view of this disclosure that varying sizes of kernel may result in varying size reductions of the raw frame. For example, applying a 5×5 kernel to a raw frame of size N×M and assigning the averaged value to the center pixel would result in a median filtered image 113 of size N-4×M-4.

Figure 3A:
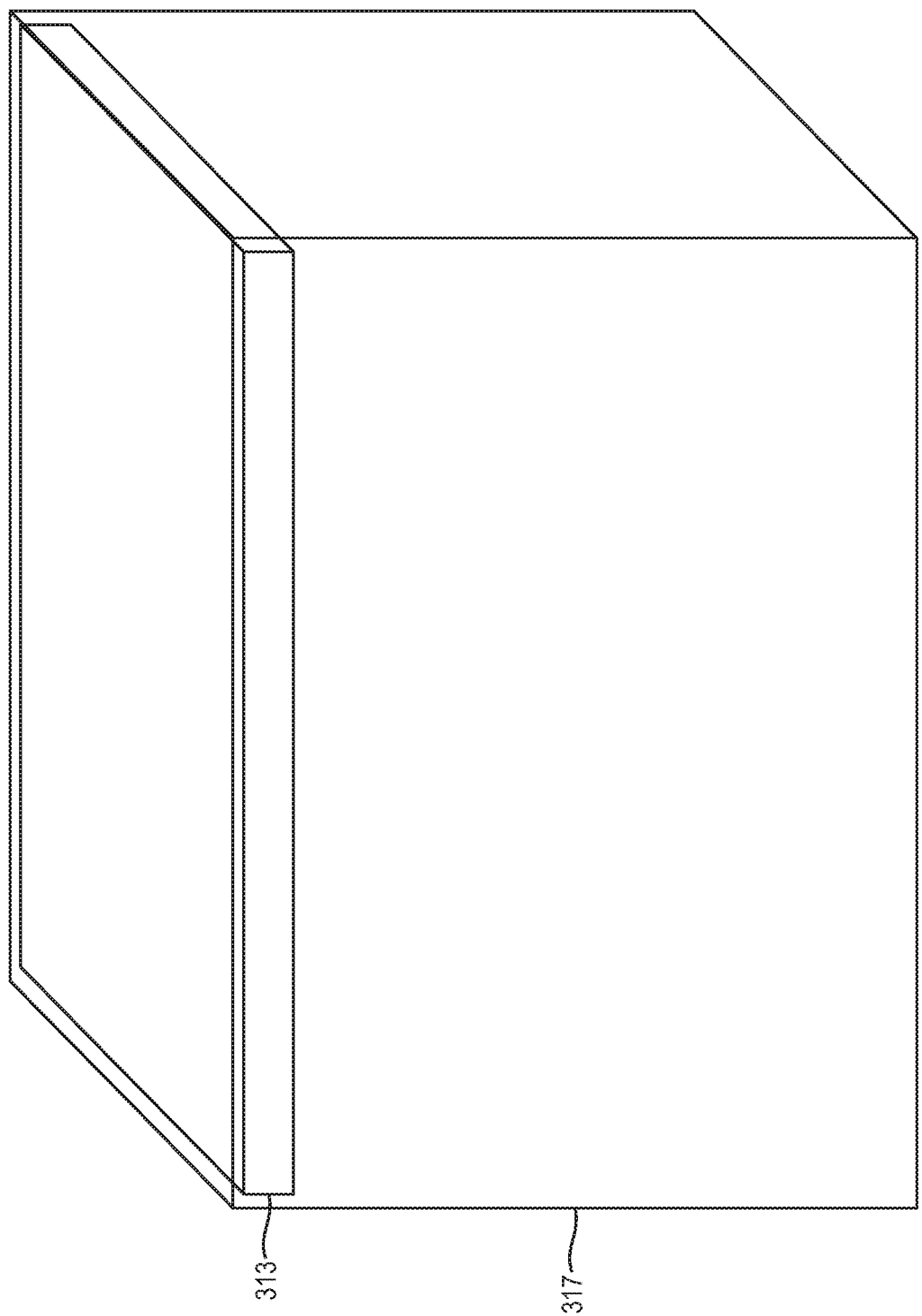
Figure 3C:
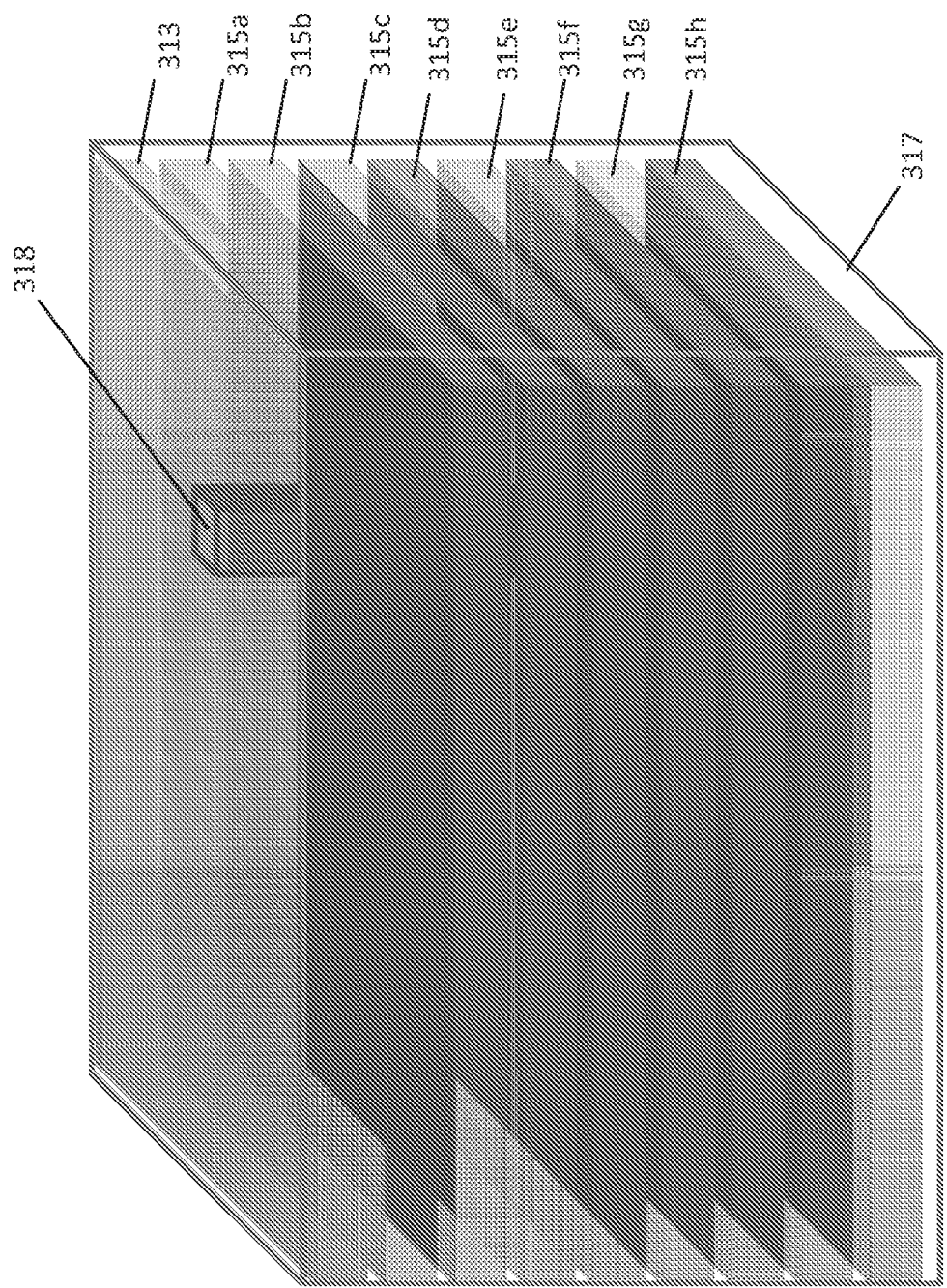

Referring now to FIGS. 3A-3C, the system can, in accordance with various embodiments, temporally stack an MFI 313 within a MFI stack 317 in memory, along with a plurality of previously median filtered images 315a-h until, as illustrated in FIG. 3B, a desired number of total MFIs (e.g., 313+315a-h) has been added to complete the MFI stack 317. Then, as illustrated by FIG. 3C, the system can apply a temporal median filter to each pixel offset value stack 318 to generate a process dataset. The pixel offset value stack 318 includes a group of spatially filtered pixel offset values, each taken from a different one of the MFIs 313, 315a-h comprising the stack and each corresponding to a same filtered pixel location. That is, only the median pixel offset value within each column 318 of temporally stacked corresponding pixels is included in the process dataset. By applying the temporal median filter, the system advantageously reduces the corrupting effect of transient objects because artificially high pixel offset values caused by abnormally bright transient radiation sources (e.g., the sun relative to a moving host platform, a missile, a bullet, or other such sources) which are detected in one particular spatially filtered pixel of one median filtered image 313 will move over time and therefore be discarded as an outlier in the temporally median filtered data.

Referring again to FIG. 1, each process data set 119 is stored in the offset file 123 stored in the memory 105. As more process data sets 119 are created, they can, in accordance with various embodiments, be averaged with a plurality of previously generated process data sets 121a-b to generate average pixel offset values, stored in the offset file, for each corresponding pixel. In accordance with various embodiments, the averaging can be performed by the processor 107 of the computing device 103 and can be any suitable method of averaging. For example, the averaging can be performed using a conventional arithmetic mean, a weighted arithmetic mean, an alpha-beta filtered weighted average, other suitable techniques, or combinations thereof. The averaging can be performed, in accordance with various embodiments, on a complete history of process data sets, a percentage thereof, a preset number of most-recent process datasets, or combinations thereof. Advantageously, continuously updating the average offset values stored in the offset file 123 allows the system 100 to apply dynamically updated and improving offset values when performing, for example, frame differencing on future data captures received from the image sensor 101.

Figure 4:
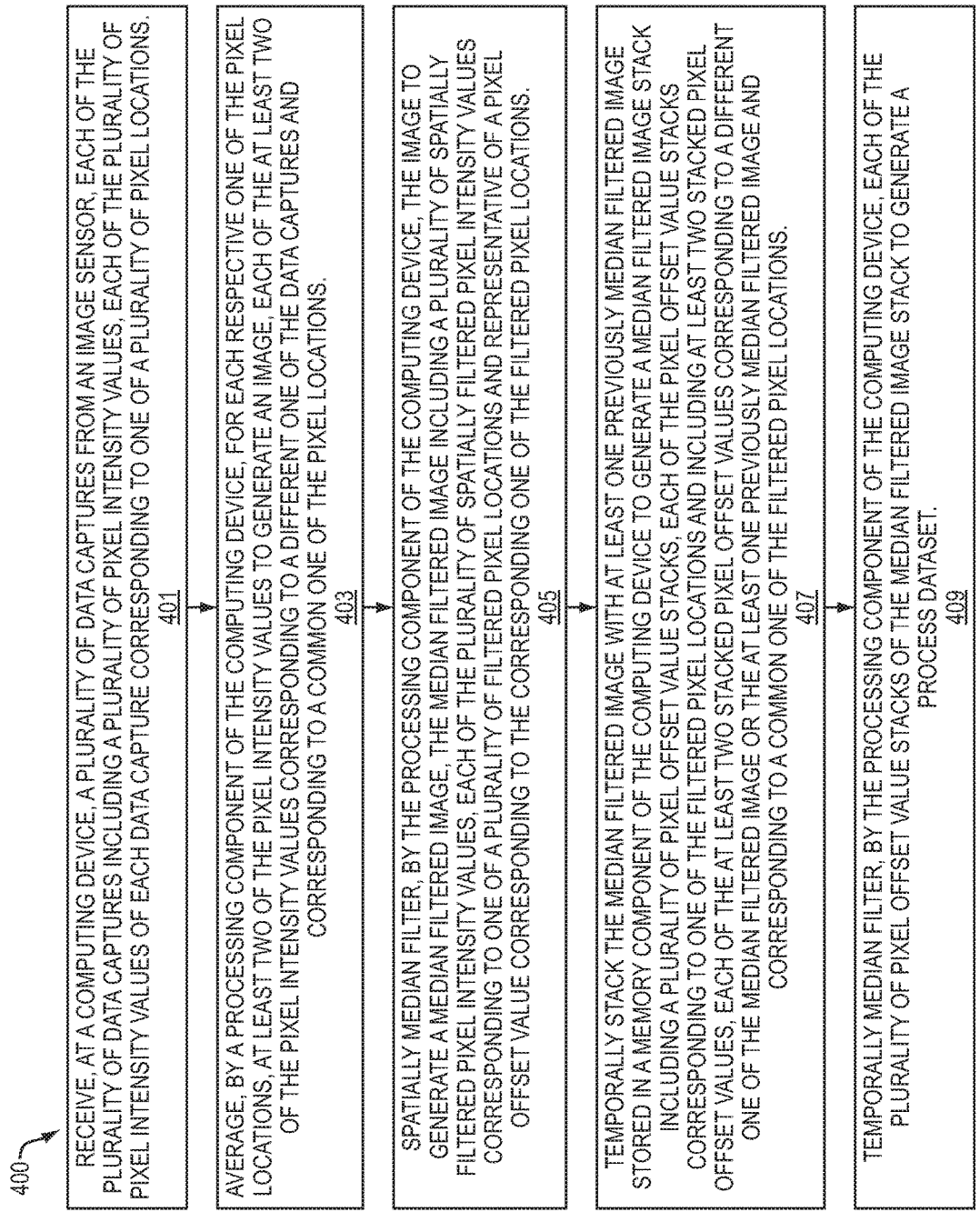
FIG. 4 is a flow chart illustrating a procedure for correcting non-uniformity in focal plane arrays in accordance with various embodiments taught herein.

Referring now to FIG. 4, a method 400 is provided that is performed by embodiments of the system for correcting non-uniformity in focal plane arrays. The method includes a step 401 of receiving, at a computing device, a plurality of data captures from an image sensor, each of the plurality of data captures including a plurality of pixel intensity values, each of the plurality of pixel intensity values of each data capture corresponding to one of a plurality of pixel locations. The method also includes a step 403 of averaging, by a processing component of the computing device, for each respective one of the pixel locations, at least two of the pixel intensity values to generate an image, each of the at least two of the pixel intensity values corresponding to a different one of the data captures and corresponding to a common one of the pixel locations. At step 405, the method includes spatially median filtering, by the processing component of the computing device, the image to generate a median filtered image, the median filtered image including a plurality of spatially filtered pixel intensity values, each of the plurality of spatially filtered pixel intensity values corresponding to one of a plurality of filtered pixel locations and representative of a pixel offset value corresponding to the corresponding one of the filtered pixel locations. At step 407, the method includes temporally stacking the median filtered image with at least one previously median filtered image stored in a memory component of the computing device to generate a median filtered image stack including a plurality of pixel offset value stacks, each of the pixel offset value stacks corresponding to one of the filtered pixel locations and including at least two stacked pixel offset values, each of the at least two stacked pixel offset values corresponding to a different one of the median filtered image or the at least one previously median filtered image and corresponding to a common one of the filtered pixel locations. The method also includes a step 409 of temporally median filtering, by the processing component of the computing device, each of the plurality of pixel offset value stacks of the median filtered image stack to generate a process dataset.

The step 401 of receiving, at a computing device, a plurality of data captures from an image sensor, each of the plurality of data captures including a plurality of pixel intensity values, each of the plurality of pixel intensity values of each data capture corresponding to one of a plurality of pixel locations can be performed, for example but not limited to, using image sensor 101 and computing device 103 as described above with reference to FIG. 1.

The step 403 of averaging, by a processing component of the computing device, for each respective one of the pixel locations, at least two of the pixel intensity values to generate an image, each of the at least two of the pixel intensity values corresponding to a different one of the data captures and corresponding to a common one of the pixel locations can be performed, for example but not limited to, using a computing device 103 having a processing component 107 and a memory component 105 to produce an image 111 as described above with reference to FIG. 1.

The step 405 of spatially median filtering, by the processing component of the computing device, the image to generate a median filtered image, the median filtered image including a plurality of spatially filtered pixel intensity values, each of the plurality of spatially filtered pixel intensity values corresponding to one of a plurality of filtered pixel locations and representative of a pixel offset value corresponding to the corresponding one of the filtered pixel locations can be performed, for example but not limited to, using a spatial median filter and a computing device 103 having a processing component 107 and a memory component 105 to generate a median filtered image (MFI) as described above with reference to FIGS. 1 and 2A-2B.

The step 407 of temporally stacking the median filtered image with at least one previously median filtered image stored in a memory component of the computing device to generate a median filtered image stack including a plurality of pixel offset value stacks, each of the pixel offset value stacks corresponding to one of the filtered pixel locations and including at least two stacked pixel offset values, each of the at least two stacked pixel offset values corresponding to a different one of the median filtered image or the at least one previously median filtered image and corresponding to a common one of the filtered pixel locations can be performed, for example but not limited to, by temporally stacking a median filtered image 113 with a plurality of previously median filtered images 115*a-d* a computing device 103 having a processing component 107 and a memory component 105 to generate a MFI stack 117 as described above with reference to FIGS. 1 and 3A-3C.

The step 409 of temporally median filtering, by the processing component of the computing device, each of the plurality of pixel offset value stacks of the median filtered image stack to generate a process dataset can be performed, for example but not limited to, using a temporal median filter and a computing device 103 having a processing component 107 and a memory component 105 to temporally filter the stacked median pixel offset values within each column 318 of temporally stacked corresponding pixels to generate a process dataset 119 as described above with reference to FIGS. 1 and 3A-3C.

Exemplary Non-Uniformity Corrected Images

Figure 5B:
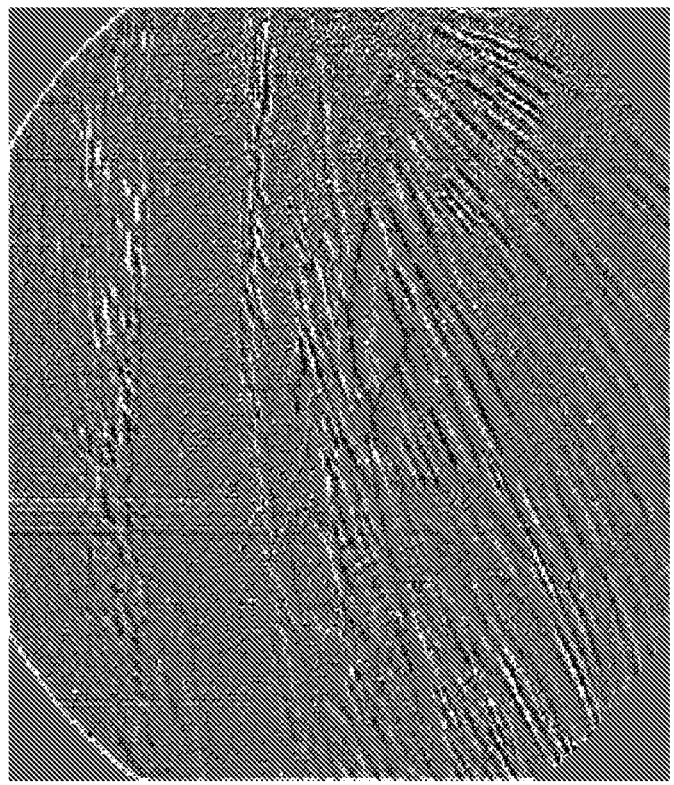
FIGS. 5A-5D are exemplary images generated using a procedure for correcting non-uniformity in focal plane arrays in accordance with various embodiments taught herein.
Figure 5A:
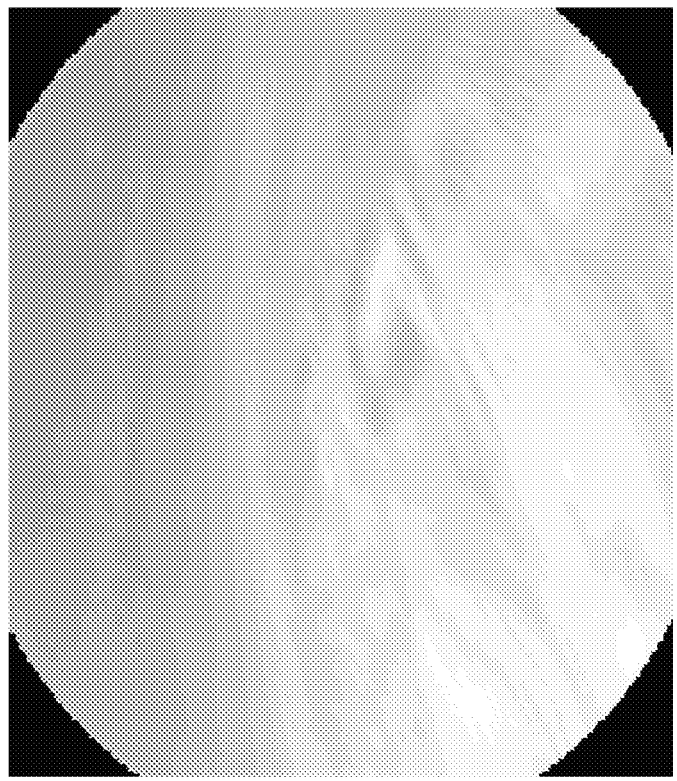
Figure 5D:
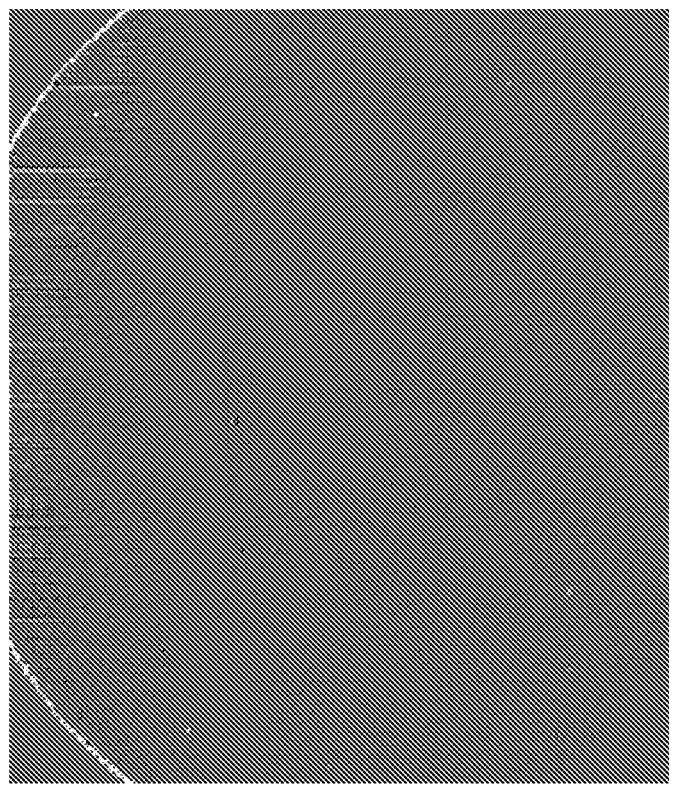
Figure 5C:
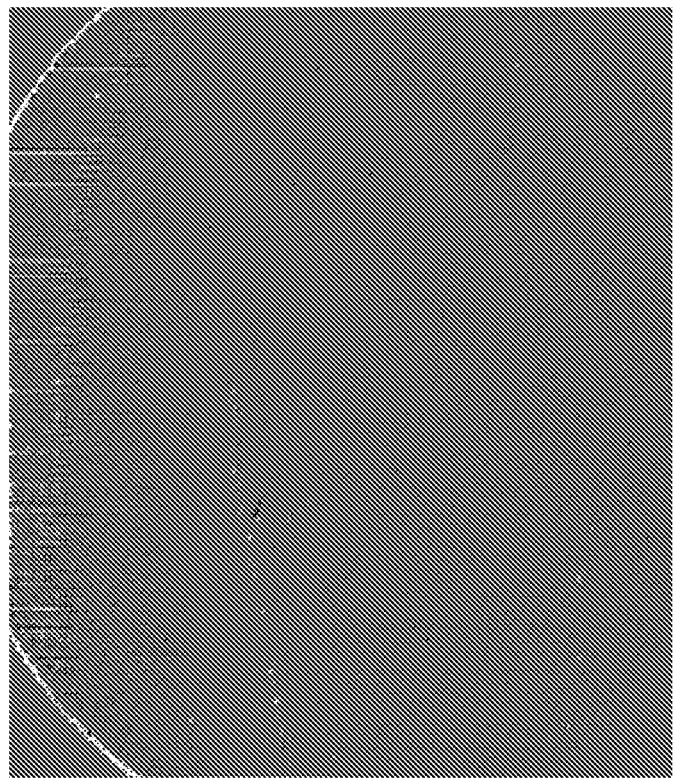

FIGS. 5A-5D are exemplary images produced using the systems and methods described herein with a system configured to capture 100 frames per second, to average 100 frames (i.e., one second of data captures) to generate each image and MFI. The system used to produce the exemplary images of FIGS. 5A-5D was also configured to include 30 MFIs per MFI stack before producing a process dataset. FIG. 5A is an example unfiltered image produced by averaging 100 frames captured at a rate of 100 frames per second. As depicted in FIG. 5A, the image includes relatively high apparent intensity and significant textural variation. FIG. 5B is an example median filtered image (MFI) generated by applying a spatial median filter having a 3×3 kernel to the image of FIG. 5A. As depicted in FIG. 5B, the MFI includes reduced apparent intensity as compared to the image of FIG. 5A but retains significant textural variation. FIG. 5C is an example process dataset generated by applying a temporal median filter to 30 MFIs, including the MFI depicted in FIG. 5B. As depicted in FIG. 5C, the process dataset is substantially smoother and more uniform than the MFI of FIG. 5B, with most of the texturing removed except for some grooving at the top of the process dataset. FIG. 5D is an example averaged set of offset values from an offset file generated by averaging 10 process datasets (i.e., 5 minutes of data). As depicted in FIG. 5D, the non-uniformities have been virtually eliminated and the grooving has been minimized at the top of the averaged offset values.

Exemplary Distributed Imaging Systems

Figure 6:
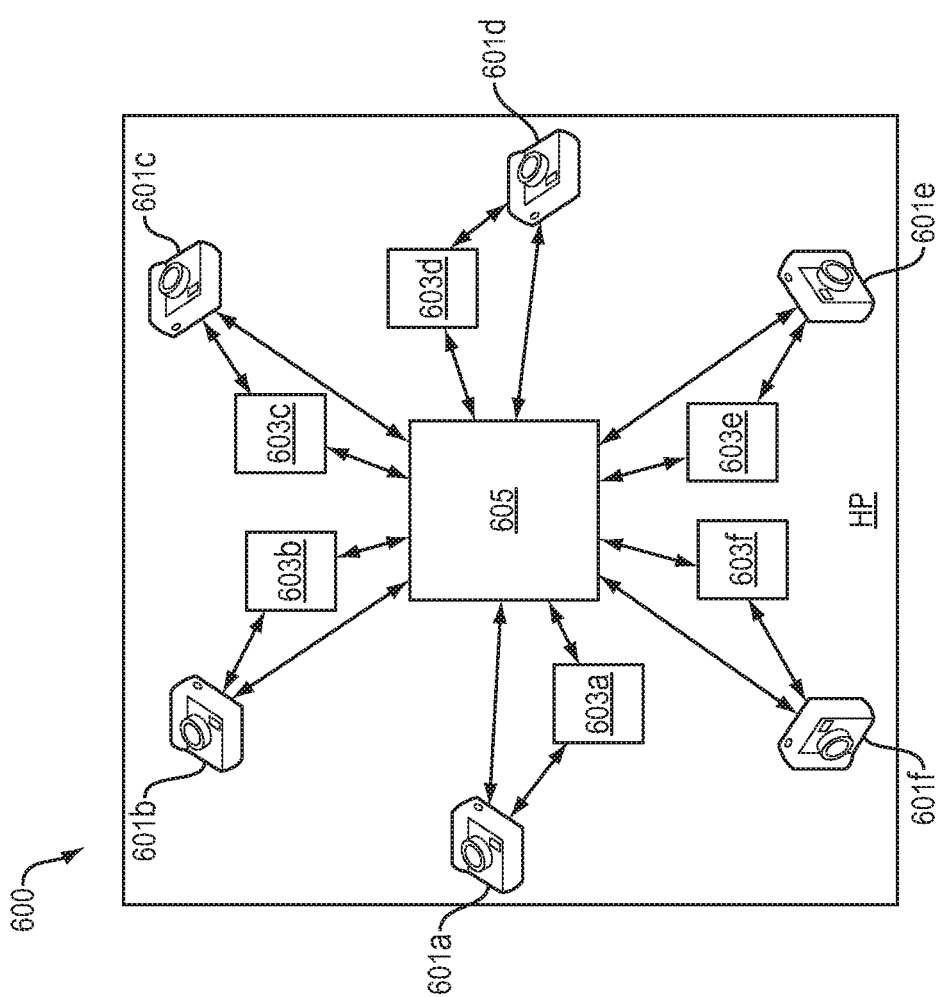
FIG. 6 is an example imaging system block diagram depicting various components which can be used to implement various of the disclosed embodiments in a distributed on-board imaging system as taught herein.

FIG. 6 is an example imaging system block diagram of an exemplary distributed on-board imaging system 600. The on-board imaging system 600 can be installed on a host platform (HP). The host platform may be a fixed-wing airplane, a helicopter, a drone or other type of mobile platform. The system 600 includes a plurality of image sensors 601a-f installed on the HP, each of the image sensors 601a-f being in electronic communication with at least one of a plurality of dedicated processors 603a-f or a central processor 605 installed on the HP. As illustrated in FIG. 6, each image sensor 601 a-f is in electronic communication with both the dedicated processor 603a-f and a central processor 605. However, it will be apparent in view of this disclosure that, in accordance with various embodiments, one or more of the image sensors 601a-f may communicate exclusively with the central processor 605. It will further be apparent in view of this disclosure that, in accordance with various embodiments, one or more of the image sensors 601a-f may connect exclusively with one of the dedicated processors 603a-f. It will still further be apparent in view of this disclosure that any combination of sensors per processor or processors per sensor can be used in accordance with various embodiments.

Image sensors 601 a-f can be any suitable device such as, for example, but not limited to, digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof. It will be apparent in view of this disclosure that image sensors 601a-f, in accordance with various embodiments can encompass any sensor configured to capture electromagnetic radiation in any spectrum for producing an image, including, for example, infrared radiation, visible light, ultraviolet radiation, x-rays, etc.

Dedicated processors 603a-f and central processor 605 can each include, for example, one or more field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. For example, in some embodiments, each dedicated processor 603a-f can be a FPGA for providing temporary storage of a limited number of data captures acquired by the corresponding image sensor 601a-f and a coarse initial analysis while the central processor 605 can be a microprocessor for conducting more detailed analysis as needed. In various embodiments, the central processor 605 can perform all processing functions, eliminating the need for dedicated processors 603a-f. In various embodiments, the dedicated processors 603a-f can perform all processing functions, eliminating the need for a central processor 605. It will be apparent in view of this disclosure that any other combinations or ratios of processors and image sensors can be used in accordance with various embodiments.

Figure 7:
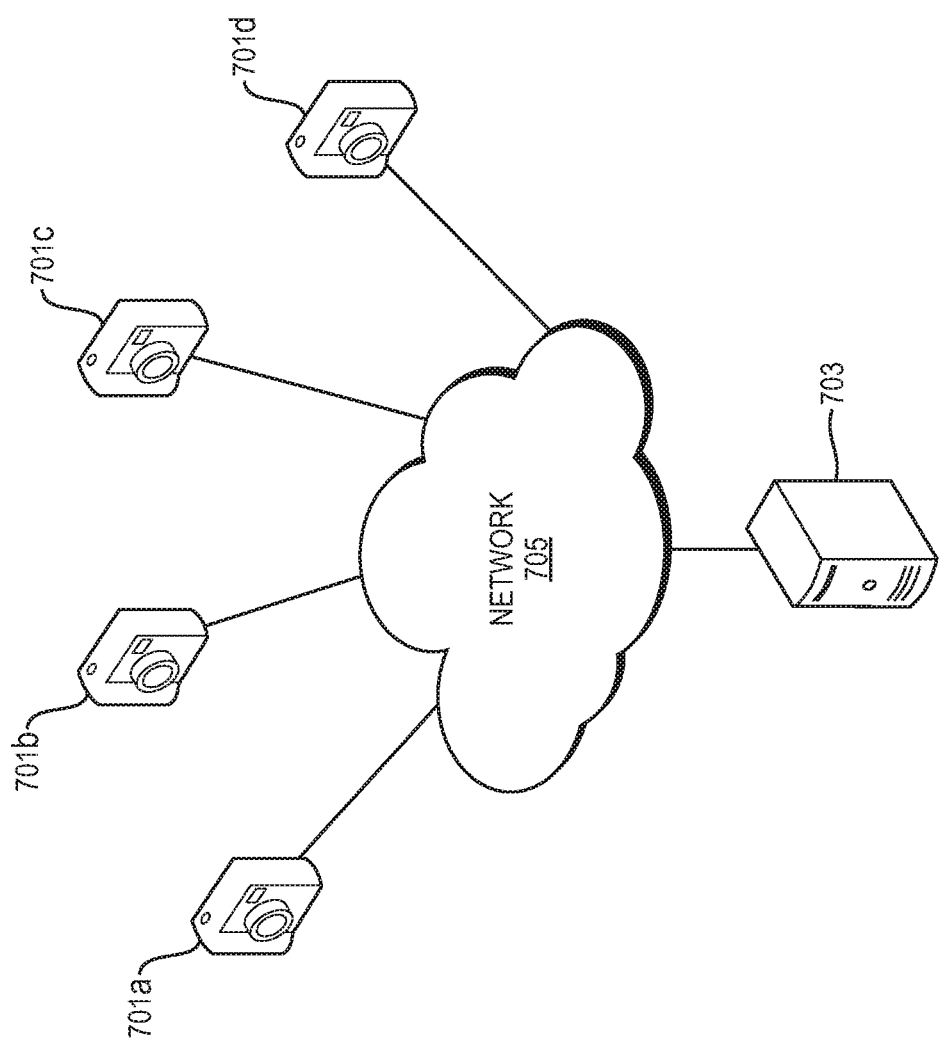
FIG. 7 is an example imaging system block diagram depicting various components which can be used to implement various of the disclosed embodiments in a distributed remote imaging system as taught herein.

FIG. 7 is an example imaging block diagram of certain distributed embodiments. Although FIGS. 1 and 5 and portions of the exemplary discussion above, make reference to a centralized system 100 operating with on one or more co-located image sensors and/or processors, one will recognize that various of the components and modules within the system 100 may instead be distributed across a network 705 in separately or remotely located image sensors 701a-d such as digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof and processing systems 703 such as one or more server systems, desktop computer devices, mobile computer devices, field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. As one example, data captures acquired by the image sensors 701a-d can be received by the remote processing system(s) 703 for scene-based non-uniformity correction in focal plane arrays. In some embodiments, the remote processing system(s) 703 can provide feedback to one or more of the image sensors 701a-d based on the scene-based non-uniformity correction in focal plane arrays. In some distributed remote imaging systems, the image sensors 701a-d and processing systems 703 of the system 100 can be separately located and can be in communication with one another across the network 705.

Exemplary Computing Devices

Figure 8:
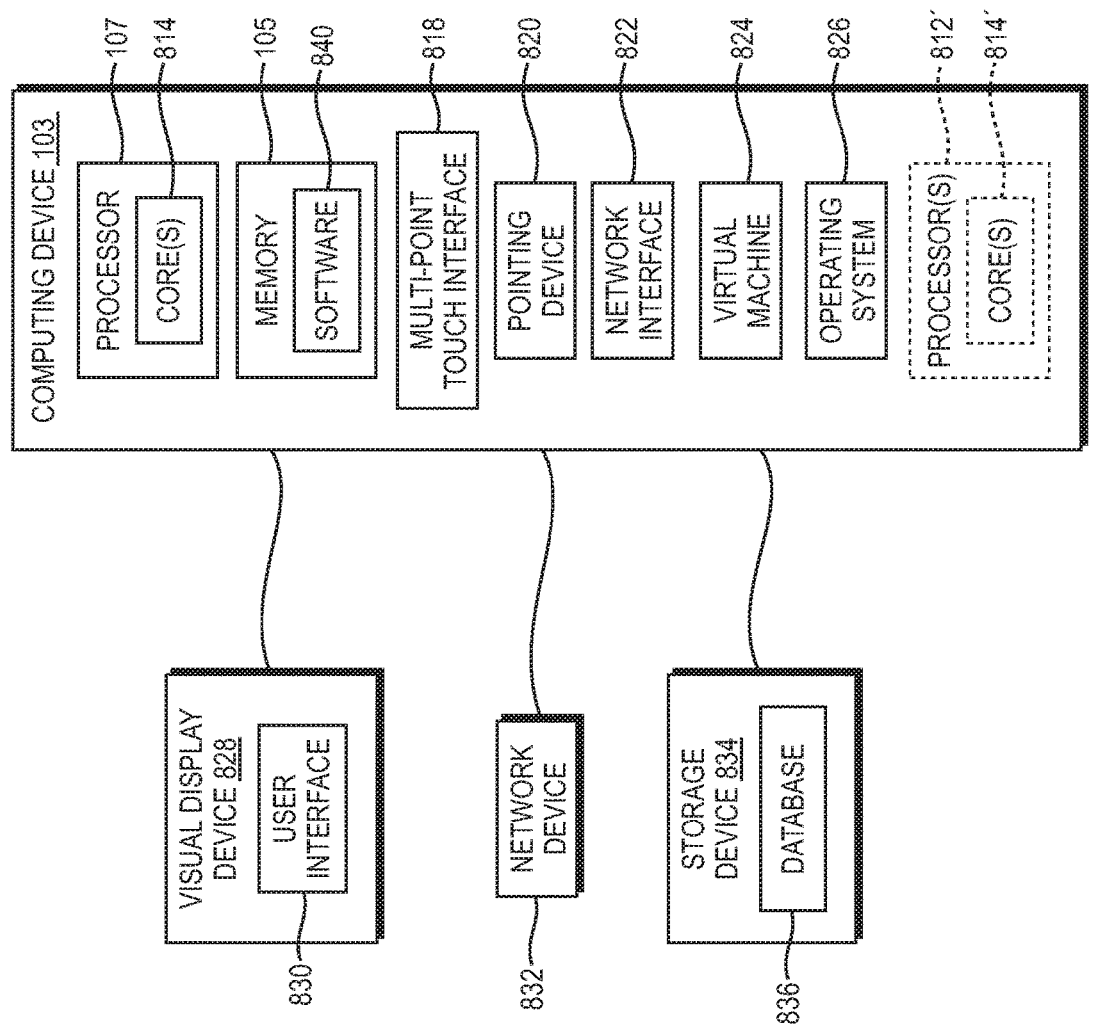
FIG. 8 is an example computational device block diagram depicting various components which can be used to implement various of the disclosed embodiments as taught herein.

FIG. 8 is a block diagram of the exemplary computing device 103 or portions thereof, in accordance with various embodiments and, for clarity, refers back to and provides greater detail regarding various elements of the system 100 of FIG. 1. The computing device 103 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 105 included in the computing device 103 can store computer-readable and computer-executable instructions or software for performing the operations disclosed herein. For example, the memory 105 can store a software application 840 which is configured to perform various of the disclosed operations (e.g., spatially filtering a received data capture to produce a spatially filtered image 109 then predictively differencing the spatially filtered image 109 based on at least two previously filtered images 111a-b stored in the memory component 105). The computing device 103 can also include configurable and/or programmable processor 108 and an associated core 814, and optionally, one or more additional configurable and/or programmable processing devices, e.g., processor(s) 812' and associated core(s) 814' (for example, in the case of computational devices having multiple processors/cores), for executing computer-readable and computer-executable instructions or software stored in the memory 105 and other programs for controlling system hardware. Processor 107 and processor(s) 812' can each be a single core processor or multiple core (814 and 814') processor. In some embodiments, processor 107 and processor(s) 812' can each be one or more of a field-programmable gate array, a microprocessor, an application specific integrated circuit, integrated circuit, a monolithic integrated circuit, a microchip, a programmable logic device, a complex programmable logic device, any other suitable processing device, or combinations thereof.

Virtualization can be employed in the computing device 103 so that infrastructure and resources in the computing device can be shared dynamically. A virtual machine 824 can be provided to handle a process running on multiple processors so that the process appears to be using only one computing resource rather than multiple computing resources. Multiple virtual machines can also be used with one processor.

Memory 105 can include a computational device memory or random access memory, such as DRAM, SRAM, EDO RAM, and the like. Memory 105 can also include, for example, flip-flops, memory blocks, RAM blocks, programmable read-only memory, and the like. Memory 105 can include other types of memory as well or combinations thereof.

A user can interact with the computing device 103 through a visual display device 828, such as a computer monitor, which can display one or more user interfaces 830 that can be provided in accordance with exemplary embodiments. The computing device 103 can include other I/O devices for receiving input from a user, for example, a keyboard or any suitable multi-point touch interface 818, or a pointing device 820 (e.g., a mouse). The keyboard 818 and the pointing device 820 can be coupled to the visual display device 828. The computing device 103 can include other suitable conventional I/O peripherals.

The computing device 103 can also include one or more storage devices 834, such as a hard-drive, CD-ROM, or other computer readable media, for storing data and computer-readable instructions and/or software that perform operations disclosed herein. Exemplary storage device 834 can also store one or more databases 836 for storing any suitable information required to implement exemplary embodiments. The databases 836 can be updated manually or automatically at any suitable time to add, delete, and/or update one or more items in the databases.

The computing device 103 can include a network interface 822 configured to interface via one or more network devices 832 with one or more networks, for example, Local Area Network (LAN), Wide Area Network (WAN) or the Internet through a variety of connections including, but not limited to, standard telephone lines, LAN or WAN links (for example, 802.11, T1, T6, 56 kb, X.25), broadband connections (for example, ISDN, Frame Relay, ATM), wireless connections, controller area network (CAN), or some combination of any or all of the above. The network interface 822 can include a built-in network adapter, network interface card, PCMCIA network card, card bus network adapter, wireless network adapter, USB network adapter, modem or any other device suitable for interfacing the computing device 103 to any type of network capable of communication and performing the operations described herein. Moreover, the computing device 103 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 103 can run any operating system 826, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 826 can be run in native mode or emulated mode. In an exemplary embodiment, the operating system 826 can be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for correcting non-uniformities in focal plane arrays, said method comprising:
 receiving, at a computing device, a plurality of sampling image frames captured by an image sensor, wherein said sampling image frames includes a plurality of pixel intensity values, each of said pixel intensity values corresponds to one of a plurality of pixel locations of a respective one of said sampling image frames;
 averaging, via a processing component of said computing device, for one of said pixel locations, at least two of said pixel intensity values to generate an image frame, each of said at least two pixel intensity values corresponds to a different one of said captured sampling image frames and corresponds to a common one of said pixel locations;
 spatially median filtering, by said processing component of said computing device, said image frame to generate a median filtered image frame, wherein said median filtered image frame includes a plurality of spatially filtered pixel intensity values, each of said plurality of spatially filtered pixel intensity values corresponds to one of a plurality of filtered pixel locations and representative of a pixel offset value corresponding to said corresponding one of said filtered pixel locations;
 temporally stacking said median filtered image frame with at least one previously median filtered image frame stored in a memory component of said computing device to generate a median filtered image stack having a plurality of pixel offset value stacks, each of said pixel offset value stacks corresponds to one of said filtered pixel locations and includes at least two stacked pixel offset values, each of said at least two stacked pixel offset values corresponds to a different one of said median filtered image frame or said at least one previously median filtered image frame and corresponding to a common one of said filtered pixel locations; and generating a non-uniformities corrected image frame, via said processing component of said computing device, by temporally median filtering said plurality of pixel offset value stacks of said median filtered image stack.

2. The method of claim 1, further comprising providing a display device for displaying said non-uniformities corrected image frame.

3. The method of claim 1, wherein said averaging pixel intensity values is performed by using a weighted average.

4. The method of claim 1, wherein said averaging is performed without closing a shutter for said focal plane array.

5. The method of claim 1, wherein said pixel intensity values are numerical expressions of radiation brightness detected by said image sensor.

6. The method of claim 1, wherein said spatially median filtering is performed without closing a shutter for said focal plane array.

7. The method of claim 1, wherein said generating is performed via a median filter.

8. A focal plane array comprising:
  an image sensor captures a plurality of sampling image frames, wherein said sampling image frames includes a plurality of pixel intensity values, each of said pixel intensity values corresponds to one of a plurality of pixel locations of a respective one of said image frames; and
  a computing device, in electronic communications with said image sensor, for:
    averaging, via a processing component of said computing device, for one of said pixel locations, at least two of said pixel intensity values to generate an image frame, each of said at least two pixel intensity values corresponds to a different one of said captured sampling image frames and corresponds to a common one of said pixel locations;
    spatially median filtering, by said processing component of said computing device, said image frame to generate a median filtered image frame, wherein said median filtered image frame includes a plurality of spatially filtered pixel intensity values, each of said plurality of spatially filtered pixel intensity values corresponds to one of a plurality of filtered pixel locations and representative of a pixel offset value corresponding to said corresponding one of said filtered pixel locations;
    temporally stacking said median filtered image frame with at least one previously median filtered image frame stored in a memory component of said computing device to generate a median filtered image stack having a plurality of pixel offset value stacks, each of said pixel offset value stacks corresponds to one of said filtered pixel locations and includes at least two stacked pixel offset values, each of said at least two stacked pixel offset values corresponds to a different one of said median filtered image frame or said at least one previously median filtered image frame and corresponding to a common one of said filtered pixel locations; and
    generating a non-uniformities corrected image frame, via said processing component of said computing device, by temporally median filtering said plurality of pixel offset value stacks of said median filtered image stack.

9. The focal plane array of claim 8, further comprising a display device for displaying said non-uniformities corrected image frame.

10. The focal plane array of claim 8, wherein said averaging is determined by using a weighted average.

11. The focal plane array of claim 8, wherein said averaging is performed without closing a shutter for said focal plane array.

12. The focal plane array of claim 8, wherein said pixel intensity values are numerical expressions of radiation brightness detected by said image sensor.

13. The focal plane array of claim 8, wherein said spatially median filtering is performed without closing a shutter for said focal plane array.

14. The focal plane array of claim 8, wherein said generating is performed via a median filter.

* * * * *